A. P. CHAPIN.
Straw Cutter.
No. 68,412.
Patented Sept. 3, 1867.
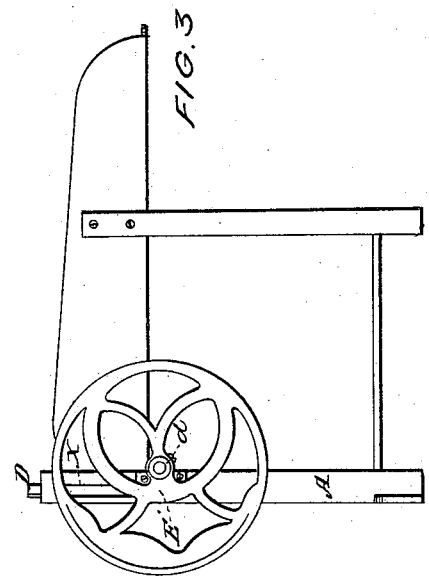
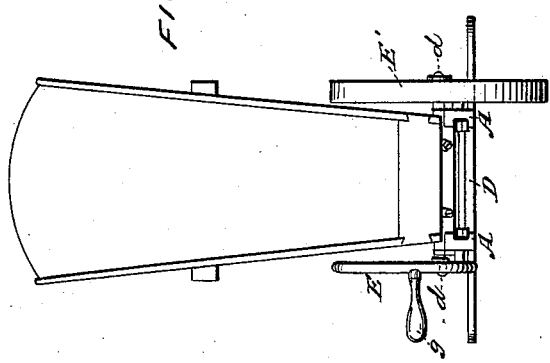
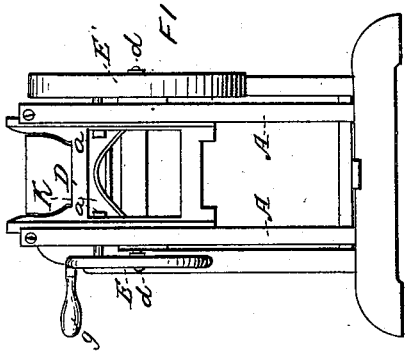
WITNESSES:
George J. Ellis
V. C. Clayton
INVENTOR:
A. P. Chapin
by atty
J. C. Clayton

United States Patent Office.

A. P. CHAPIN, OF CHICOPEE FALLS, MASSACHUSETTS.

Letters Patent No. 68,412, dated September 3, 1867.

IMPROVEMENT IN FEED AND STRAW-CUTTER.

*The Schedule referred to in these Letters Patent and making part of the same.*

TO ALL WHOM IT MAY CONCERN:

Be it known that I, A. P. CHAPIN, of Chicopee Falls, in the county of Hampden, and in the State of Massachusetts, have invented a certain new and useful Machine for Cutting Hay, Straw, Rags, and other materials; and I do hereby declare that the following is a full, clear, and exact description thereof, reference being had to the accompanying drawings, and to the letters of reference marked thereon.

The nature of my invention consists in the construction of a semicircular knife, in combination with a bar or gate, which rests upon or is guided in perpendicular standards. The said bar or gate receives a reciprocating vertical motion, through means of its bolts (which have friction-rollers) resting in the grooves on the inner side of each of two eccentric wheels, which revolve upon the same shaft, turned by crank or belt; all of which will more fully hereinafter be shown.

To enable others skilled in the art to make and use my invention, I will now describe its construction and operation. In the drawings—

Figure 1 is a plan view,

Figure 2 is an end elevation, and

Figure 3 is a side elevation.

The same letters are used to designate like parts in the different figures.

A A are the fore legs of the cutter. The sides of each facing the knife is grooved, as shown in fig. 1, for the purpose of guiding the gate D. These standards are also slotted (as shown in fig. 3 at $x$) to permit the passage of the bolts $a\ a$ through to the eccentric wheels. On the end of each of the bolts $a\ a$ is a friction-roller, resting in the groove of the eccentric wheel nearest it. These friction-rollers are obviously for the purpose of decreasing the friction of the wheel, which would be very great without the said rollers. The gate D is made of a square wooden frame, (shown in figs. 1 and 2,) but its place may be supplied by an iron bar, which would be made to fit in the grooves of the standards, and its ends have friction-rollers like the gate D and bolts $a\ a$. K, the knife, is made of a semicircular shape, its cutting edge being the inner portion of the semicircle, thus presenting a concave outline. The manner of attaching the knife, and its shape, are well shown in fig. 2. In the drawings the knife is represented as passing down by a mouth and shear, but the shape of the knife being altered, it may be made to cut upon the bottom of the mouth of the box, which may be protected by a zinc or copper lining, as desired, or it may not be protected. E E' are the eccentrics, turned by the crank $g$ upon the same shaft $d$. A side view of wheel E' is shown in fig. 3, and is represented as being constructed in combination with a fly-wheel. This is not absolutely necessary, and so may be done without, but when great power is necessary, as in cutting rags, paper, &c., it will be found of immense assistance, from the fact of its putting forth its power while cutting the material at the right moment, and from its rapid motion upward during the interval in which the knife is not at work. The eccentric wheels are directly opposite each other, their common shaft $d$ resting in journals in the legs A A. There are grooves in these wheels about a quarter of an inch from the outside circumference of each wheel, and on the side next to the box.

My machine is put in operation by turning crank $g$. The power then passes to the shaft $d$, and both of the eccentric wheels are set going, and they force the friction-wheels of bolts $a\ a$ (while on the downward turn, but the reverse on the upward turn) outward and downward, thus communicating a vertical reciprocating motion to gate D with knife K, they being guided by the grooves in standards A A. By the above simple operation the material is cut.

Having thus fully described my invention, what I desire to claim and secure by Letters Patent, is—

The semicircular knife K, in combination with the knife-bar, operating in the gate-frame or standards A A, as set forth, and the purposes described.

In testimony that I claim the above-described invention for an improved machine for cutting hay, straw, and other materials, I have hereunto signed my name this 16th day of August, 1866.

A. P. CHAPIN.

Witnesses:
    E. V. B. HOLCOMB,
    T. G. CLAYTON.